United States Patent [19]

Granger et al.

[11] Patent Number: 5,035,685
[45] Date of Patent: Jul. 30, 1991

[54] RECOVERY DEVICE AND PROCEDURE FOR EXTRACTING A SHEATH AFTER IT HAS BEEN FOLDED TRANSVERSELY

[75] Inventors: Claude Granger, Saint-Chamond; Bernard Troadec, Plougastel Daoulas, both of France

[73] Assignee: Atochem, Paris, France

[21] Appl. No.: 551,525

[22] Filed: Jul. 11, 1990

[30] Foreign Application Priority Data

Jul. 12, 1989 [FR] France ................................ 8909382

[51] Int. Cl.⁵ ............................................. B31F 1/00
[52] U.S. Cl. ..................... 493/416; 493/413; 493/448; 493/451
[58] Field of Search ............... 493/416, 413, 448, 451; 414/910, 911, 778

[56] References Cited

U.S. PATENT DOCUMENTS

| | | | |
|---|---|---|---|
| 3,703,065 | 11/1972 | Soodalter | 53/581 |
| 4,106,398 | 8/1978 | Buisson | 493/356 |
| 4,265,439 | 5/1981 | Sundberg | 493/940 |
| 4,721,503 | 1/1988 | Rasmussen et al. | 493/940 |
| 4,775,359 | 10/1988 | Johnson | 493/381 |
| 4,867,736 | 9/1989 | Rasmussen et al. | 493/940 |

*Primary Examiner*—Frederick R. Schmidt
*Assistant Examiner*—John A. Marlott
*Attorney, Agent, or Firm*—Sigalos, Levine and Montgomery

[57] ABSTRACT

An improvement in the method and apparatus for transversely folding a continuous tubular sleeve. The sleeve is unwound onto a plurality of movable conformators mounted on a rotatable platen which supports the folded sleeve segments. After the desired amount of concentric folds are formed, the platen and conformators are rotated essentially 90° to bring the folded segment into a horizontal plane for extraction. Also disclosed is a mobile device for performing the extraction of the folded sheath segment.

11 Claims, 2 Drawing Sheets

RECOVERY DEVICE AND PROCEDURE FOR EXTRACTING A SHEATH AFTER IT HAS BEEN FOLDED TRANSVERSELY

BACKGROUND OF THE INVENTION

The present invention pertains to a recovery device and procedure for storing a tubular sheath after it has been folded transversely. The invention consists, after the transverse folding of a continuous longitudinal sheath so as to obtain in the vertical plane a sheath with superimposed concentric annular folds, of fitting onto the folding machine a device for tilting in the essentially horizontal plane the folded sheath without perceptible destruction or deformation of the formed folds, in a manner, so as to facilitate its extraction.

French Patent 2,281,211 describes a machine that can effect the transverse folding of a continuous tubular sheath. According to the arrangement of this machine, the sheath, maintained open close to its end with a circular or oblong section, is immobilized at a point located at the selected height of the folds, then on this side of its end it is gripped at least two sites located symmetrically in relation to the virtual center of the open sheath and turned down on itself in a manner such that the sites where it is gripped are brought close to the end. This gripping is effected at a distance from the end equal to twice the desired final height of the fold. After this is done, the grip is released and then the gripping, folding back, release cycle is repeated as many times as is necessary in order to obtain the desired number of folds. The sheath is then divided into sections on top of the last fold. The segment of sheath folded on itself in multiple concentric layers which constitutes a packaging stock is removed from the device before the manufacture of a new segment.

The folding device and procedure taken up again in their principle in the present invention yield good results but, as will be seen below, present serious drawbacks with regard to the discharge of the folded sheath segment from the manufacturing device, especially when the sheath has a large diameter, e.g., greater than 1.20 meters.

SUMMARY OF THE INVENTION

The present invention overcomes the problems of the prior art and provides for the ready discharge of the folded sheath, even those with large diameters.

Briefly, the present invention is directed to an improvement in a machine for forming and discharging a segment of tubular sheath having been folded transversely at least once, in which a fixed frame allows the vertical unwinding of an open sheath and has columns serving as vertical guides to a mobile annular gripping assembly for gripping the outside of a sheath at a distance equal to at least twice the desired height of the fold and for lowering from this height after releasing the sheath and in which means are provided to maintain the form of the inside of the folded segment of the sheath when it is severed from unfolded sheath, the improvement comprising:

(a) a rotatable platen in operative association with said vertical guides and gripping assembly to form said folds and to support said folded segment, and (b) at least two movable conformators operatively connected to said platen for rotation therewith such that said conformators delimit a deformable periphery of said sheath.

The invention also comprises a mobile extractor device and method for removing a folded tubular sheath from a forming machine as hereinafter set forth.

DETAILED DESCRIPTION

Figure 1:
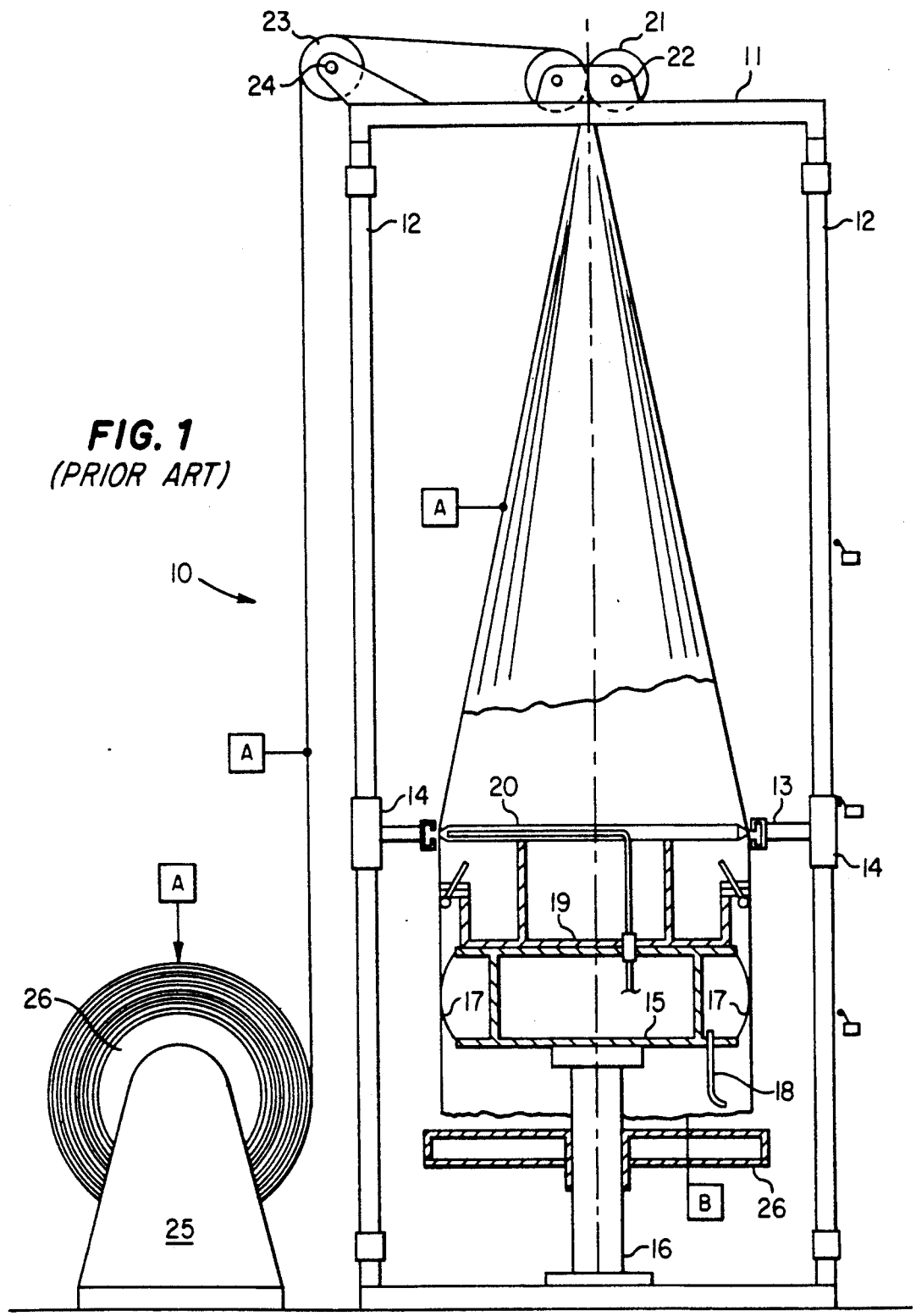
FIG. 1 is an elevational view of a prior art folding device.

In accordance with the prior art technique, presented in FIG. 1, a folding machine 10 comprises a fixed frame 11 with which are integral columns 12 serving as vertical guides for a mobile annular assembly 13 which can slide along the columns 12 by means of a sleeves 14.

At the center of the frame in its lower part is located a mandrel 15 positioned on a base 16 and which has an exterior wall 17 which is flexible such that it can be dilated radially by the pressure of a fluid conducted to the interior of the mandrel 15 as by pipe 18.

On the mandrel 15 is positioned a support 19 on which is attached an annular platen 20. This platen includes means that make it possible to push the sheath A into the gripping system(s) located on the annular assembly 13.

At the center of the frame in its upper part is located a roller 21 mounted idly on an axis 22. A second roller 23 mounted idly on an axis 24 and positioned parallel to the roller 21 can be attached at the top of the frame 11. At the foot of the frame is positioned a fixed support or cradle 25 to carry a sheath bobbin 26.

The free end B of the sheath A is engaged on the roller(s) 23 and 21, then is opened and inserted between the annular assembly 13 and the annular platen 20, then is placed on top of the mandrel 15 in such a manner that it is located lower than this mandrel and that the sheath A unrolling from the bobbin completely enshrouds the platen 20 and the mandrel 15.

Actuation means, e.g., mechanical, magnetic, electric and/or electronic means, enable sleeves 14 to slide from the top to the bottom and from the bottom to the top.

When operating the machine, a pressure is established within the mandrel 15 such that the flexible wall 17 dilates towards its outside and, by means of friction, immobilizes the sheath A close to its end B.

The annular assembly 13, positioned at twice the height of the desired fold of the sheath, receives into its gripping systems the sheath pushed by the means attached on the platen 20. When these gripping means are drawn aside, the annular assembly is brought down to the free end B of the sheath. The gripping systems of the annular assembly are released and the said annular assembly is brought back to its initial height for a new folding movement.

When the desired number of folds is reached, the sheath is severed and the segment of sheath folded on itself is discharged. These as noted, are all conventional means disclosed in the prior art.

Although the device is well adapted for folding the sheath, it exhibits difficulties in the discharge operation, especially for large-diameter sheaths. In accordance with the described device, the successive layers of the segment of folded sheath are only retained at a single point on a small surface thanks to the radial pressure of the mandrel 15. This pressure is insufficient if the sheath is thick, and the successive layers easily slide over each other because of their weight. To resolve this drawback, a platen 26 has been provided on which rests the segment of folded sheath. This improvement does not facilitate the discharge operation to a greater extent.

In accordance with this system, the discharge is effected by vertically extracting the folded sheath from the folding machine. After cutting the sheath, the support 19 and the annular platen 20 with the sheath A are raised up again along the length of the frame in a manner such as to disengage the part of the machine situated above the segment of the folded sheath. The segment of folded sheath must then be raised, after deflation of the flexible exterior wall 17 of mandrel 15, to be released from the said mandrel. This operation is particularly delicate and requires complicated equipment when discharging segments of folded sheath of large diameter. The folded sheath must be grasped very strongly only in its upper part before being lifted up, which sometimes induces tears and frequently induces a deformation of the folding in the form of slipping of the folds because of the weight of the unit.

Figure 2A:
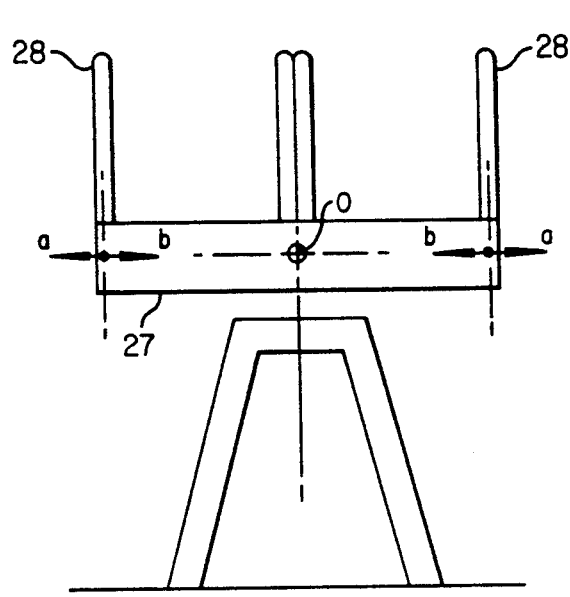
FIGS. 2A and 2B are elevational views of a folding device of the present invention showing the device in its sheath forming position, 2A, and its sheath discharging position, 2B.
Figure 2B:
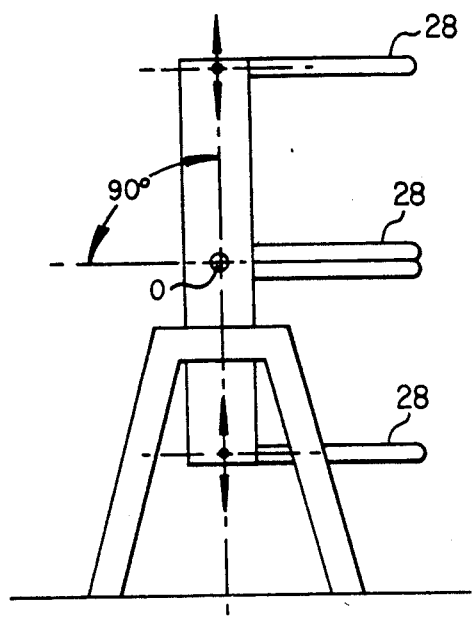

The object of the invention, illustrated in FIGS. 2A and 2B, is to transform fixed platen 26 and mandrel 15 assembly of the prior art into a rotatable system making it possible to lead, without perceptible deformation, the segment of folded sheath into a horizontal position so that it can be slid and suspended by its interior on at least one discharge arm separate from the machine.

Referring to FIGS. 2A and B there is shown a rotatable platen 27 mounted on a frame and rotatable about an axis 0. Mounted on platen 27 are at least two conformators 28 permitting the initial retention in the open position of the sheath to be folded, then during the operation of the machine to retain in form the segment of folded sheath. In order to allow rotatable platen 27 to tilt from the horizontal position, the normal position when folding is being effected, shown in FIG. 2A, to the essentially vertical discharge position shown in FIG. 2B, any suitable known means (not shown in the figures) is attached to it allowing it to rotate about the axis 0. These known means may be, among others, jackscrews attached to the frame holding rotatable platen 27 and connected to this platen 27.

Conformators 28 mounted on platen 27 delimit a deformable periphery such that in acting first from the interior on the sheath and then on the segment of folded sheath, they maintain the said segment of folded sheath either taut or not.

Conformators, 28, of which there are at least two, may be inflatable mandrels such as previously described. However, in order to facilitate construction and operations, a multiplicity of rods arranged in an annular manner on the platen is preferred. So as to assure the deformation of the periphery delimited by these conformators, they are mounted in a movable manner on platen 27. These conformators are essentially perpendicular to the mobile platen in the position of retaining the sheath or the segment of folded sheath.

The movement of these conformators 28 is controlled by any known means, such as electric means, pneumatic means such as jackscrews, electronic means, electromagnetic means or other, providing their translation movement as shown by reference numerals a←→b in FIGS. 2A and B towards the center of the mobile platen or a moving aside by folding down conformators 28 onto platen 27.

The clearance between two conformators must be sufficient, when the rotatable platen-conformator assembly is in the horizontal position, to allow the free passage between them of a means which is independent of the said assembly introduced essentially parallel to the conformators to allow for the supporting of the segment of folded sheath and its extraction from the assembly.

The platen 27 supporting conformators 28 is mounted on axis 0 permitting it to effect a rotation of at least 90 from the horizontal plane to the vertical plane and vice versa as shown in FIG. 2B. This axis of rotation 0 can divide platen 27 in its center and be supported on the columns 12 of the frame 11. But since it can be located at any point between the middle and the edge of platen 27, this axis can be supported on any frame separate from the rest of the machine.

The movement of rotation of the rotatable platen-conformator assembly is provided by any known means that can be electric, electronic, pneumatic, mechanical, electromechanical, electromagnetic or other, the most usual means being illustrated by the use of at least one jackscrew such as used in bucket elevators.

In relation to the improvement provided to the sheath-folding machine, the complete procedure for manufacturing the segment of folded sheath is described below.

With rotatable platen 27 for receiving the folded sheath essentially perpendicular to the axis of the open sheath, the open sheath enshrouds the means for pushing the sheath A into the gripping system(s) arranged on the mobile annular assembly 13. These means for pushing the sheath may be attached in a removable manner to conformators 28; the systems actuating these sheath pushers may be any known in the art and also be identical to those of the previously cited French Patent No. 2,281,211, whose disclosure is incorporated herein by reference. Sheath A is then lowered to the exterior of conformators 28 arranged essentially perpendicular to platen 27 until its end enters appreciably into contact with the platen 25 serving as a support. After having pushed conformators 28 towards the exterior so as to make the sheath A taut, the sheath is grasped at a distance equal to at least twice the desired height of the fold and the grasped part of the sheath is brought essentially to the level of platen 27. The sheath A is then released and the operation is repeated until the desired number of superimposed folds is obtained. After having cut the sheath, preferably above the last fold, and after having raised the sheath A up again so as to release the upper part of the machine and possibly retract the means for pushing the sheath into the gripping devices, in accordance with the invention one proceeds to the tilting of the platen 27 by essentially 90°.

In this tilting, the immobilized segment of folded sheath is essentially brought into the horizontal plane (FIG. 2B) taut on conformators 28 attached to platen 27. Since rotatable platen 27 is in its discharge position, one introduces any conventional discharge means into the interior of the segment of sheath, into the space left between conformators 28 onto which is brought to rest the segment of folded sheath after the tension has been reduced by moving conformators 28 towards the central part of the platen 27. Once the segment of sheath has been removed on the discharge arm, platen 27 and the conformators 28 are brought back to the position (FIG. 2A) for receiving a new sheath folding.

In accordance with the invention, the segment of folded sheath can be easily packaged and/or stored without undergoing any handling that could induce a disequilibrium in the folded mass which would lead to a deformation of the folds.

Figure 3:
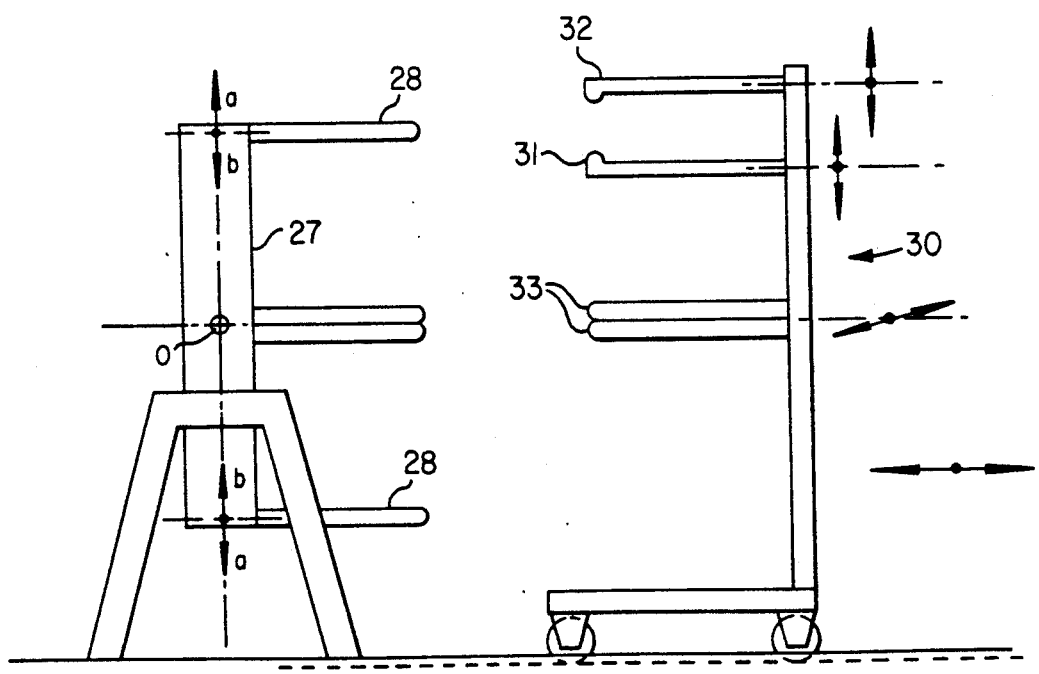
FIG. 3 is an elevational representational view of a mobile means for extracting the formed sheath from the folding device of the present invention when the device is in a sheath discharging position.

The means for extracting the folded mass and for supporting the segment of folded sheath during its extraction can be a simple rod forming a discharge arm, but in a more practical manner it could generally be the fork of a forklift truck. In a preferred manner, the extracting means is a mobile device 30 as shown in FIG. 3, provided with at least one support spindle 31, which is preferably retractable, which supports the sheath inside the folding device and possibly at least one retention spindle 32 arranged in a manner such that, in the discharge position it is located at the exterior of the sheath and can grip it with the support spindle 31. These support and retention spindles may possibly have a means for vertical translation movement. It is also possible that this mobile extraction device additionally has at least two spreading spindles 33 that can penetrate into the interior of the sheath, which are also possibly retractable, and at least one of which has a means for essentially horizontal translation movement and possible vertical translation movement to flatten the segment of sheath after it is discharged from the folding machine. When the sheath leaves the folding machine, by simultaneous displacement in the horizontal plane of the mobile spreading spindle(s) 33 and in the vertical plane of the support spindle(s) 31 accompanied possibly by the retention spindle 32, support spindle(s) 31 move(s) essentially into alignment with the spreading spindles 33, the sheath can be directly stored in the flat position, e.g., on a palette, after withdrawal of the device 30 and/or simply after retraction of the interior support and spreading spindles 31 and 33.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. In a machine for forming a segment of tubular sheath having been folded transversely at least once, in which a fixed frame allows the vertical unwinding of an open sheath and has columns serving as vertical guides to a mobile annular gripping assembly for gripping the outside of a sheath at a distance equal to at least twice the desired height of the fold and for lowering from this height after releasing the sheath and in which means are provided to maintain the form of the inside of the folded segment of the sheath when it is severed from unfolded sheath, the improvement comprising:
    (a) a rotatable platen located within the periphery of said vertical guides and said gripping assembly for forming folds, said rotatable platen supporting said segment of folded sheath, and
    (b) at least two movable conformators mounted on said rotatable platen such that said conformators delimit a deformable periphery of said sheath, and
    (c) wherein said platen and said conformators rotate so as to bring said segment of folded sheath into an essentially horizontal plane for extraction.

2. The machine of claim 1, wherein the axis of rotation of said rotatable platen is at any point between the middle and edge of said platen.

3. The machine of claim 2, wherein the rotation of the mobile platen is effected by at least one jackscrew.

4. The machine of claim 3, wherein the conformators are movable on the rotatable platen and are essentially perpendicular to this platen in the position for retaining the sheath or the segment of folded sheath.

5. The machine of any one of claims 1 to 4, wherein the conformators are capable of a translation movement towards the center of the rotatable platen.

6. The machine of any one of claims 1 to 4, wherein the conformators are capable of being folded down on the rotatable platen.

7. A mobile extraction means for use in cooperation with a machine in accordance with any one of claims 1 to 4 for extracting a disconnected folded sheath from said machine, comprising:
    (a) a mobile extractor capable of being positioned adjacent said machine, and
    (b) at least one support spindle projecting from said mobile extractor for supporting said disconnected folded sheath inside said machine such that said supported sheath is extracted from said machine upon moving said mobile extractor away from said machine.

8. The mobile extraction means of claim 7, also including at least one retention means projecting from said mobile extractor and positioned thereon so as to act cooperatively with said support spindle to grip said disconnected folded sheath.

9. The mobile extraction means of claim 8 wherein said spindles include means for vertical movement on said mobile extractor.

10. The mobile extraction means of claim 9, wherein the mobile extractor also has at least two spreading spindles that can penetrate into the interior of the sheath, with at least one of said spreading spindles operably connected for essentially horizontal translation movement.

11. In the method for recovering a tubular sheath on a folding machine after its transverse folding into the form of a segment of folded sheath by retaining open a sheath close to its end of circular or oblong section, unwound vertically and, after its immobilization at a point located at the selected height of its folds, by folding back on itself this end of the sheath gripped at least two sites located symmetrically in relation to the virtual center of the open sheath, the gripping being effected at a distance from the end equal to twice the desired height of the fold, the segment of folded sheath resting on a platen arranged essentially perpendicular to the axis of the open sheath, the improvement comprising retaining the segment of folded sheath immobile and taut from the inside by at least two mobile conformators attached on a rotatable platen, rotating said platen essentially by 90° so as to bring the segment of folded sheath into an essentially horizontal plane, and extracting said segment from said conformators along an essentially horizontal path.

* * * * *